Nov. 17, 1970     D. A. STANWOOD     3,540,063

TURBULENCE DISPELLING FLOAT DEVICE AND STRING

Filed Feb. 4, 1969     3 Sheets-Sheet 1

INVENTOR.
DAVID A. STANWOOD
BY
ATTORNEYS.

Nov. 17, 1970  D. A. STANWOOD  3,540,063
TURBULENCE DISPELLING FLOAT DEVICE AND STRING
Filed Feb. 4, 1969  3 Sheets-Sheet 2

INVENTOR.
DAVID A. STANWOOD
BY
ATTORNEYS.

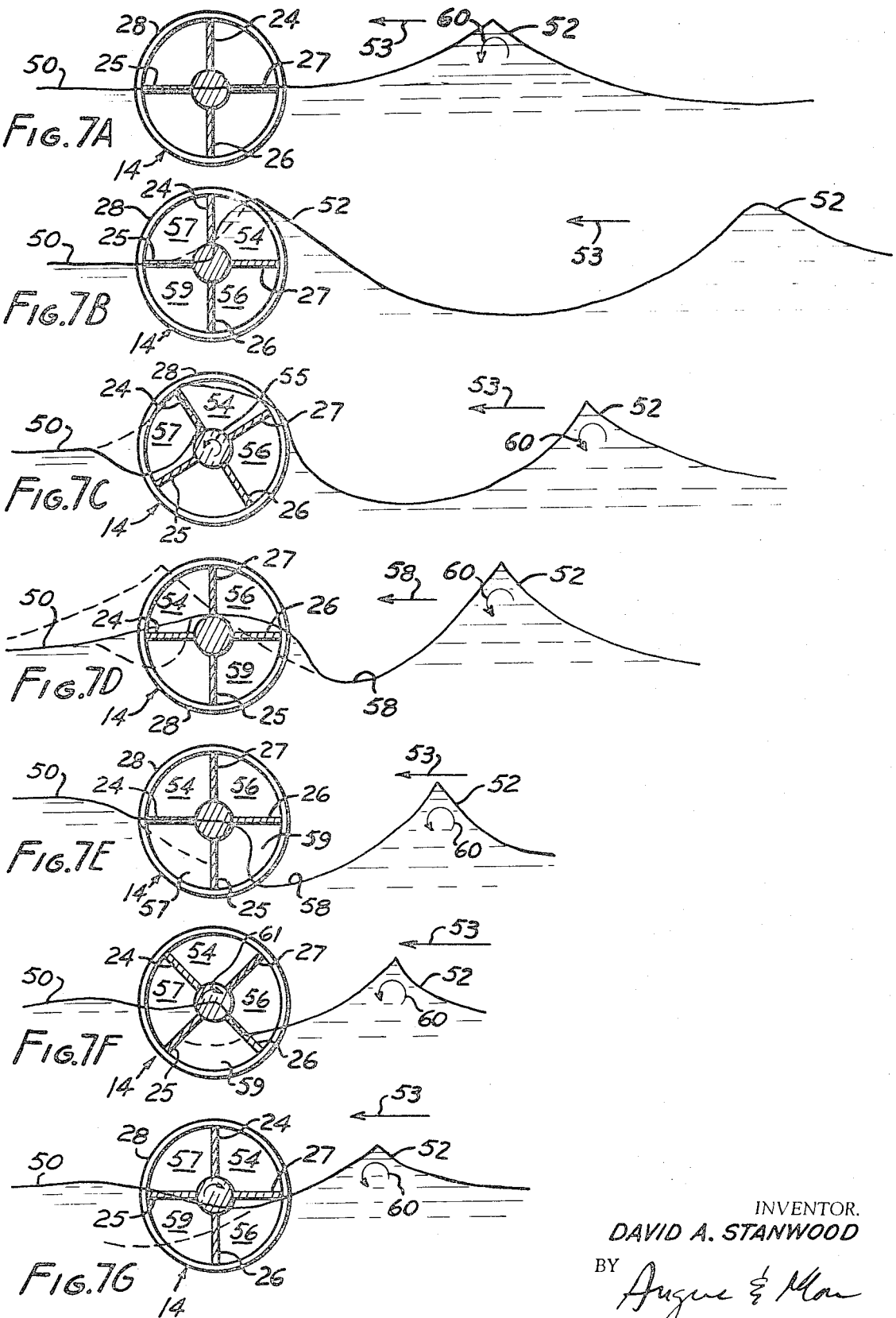

# United States Patent Office 3,540,063
Patented Nov. 17, 1970

3,540,063
TURBULENCE DISPELLING FLOAT DEVICE AND STRING
David Arthur Stanwood, West Covina, Calif., assignor to Swimquip, Inc., El Monte, Calif., a corporation of California
Filed Feb. 4, 1969, Ser. No. 796,333
Int. Cl. E04h 3/16
U.S. Cl. 4—172                        13 Claims

ABSTRACT OF THE DISCLOSURE

A turbulence dispelling float device according to the present disclosure comprises a housing supporting a plurality of spaced ring-shaped members on impervious ribs. Buoyant means is provided, and the float device may be journalled to a cable for rotation about its axis. According to one feature of the present invention, a string of float devices may be used for marking racing lanes, which string includes a winch for axially tightening or loosening the cable.

---

This invention relates to devices for reducing turbulence in bodies of water, and particularly to racing lane floats and the like for reducing turbulence in swimming pools.

A person swimming in a body of water, such as a swimming pool ordinarily generates turbulence within the water as he moves along the surface thereof. In an enclosed body of water, the waves caused by such turbulence are reflected off of the rigid wall surfaces of the pool to increase the turbulence in the water. When several swimmers are engaged in a race in an enclosed body of water, such as a swimming pool, turbulence generated by the swimmers' movement, can have a detrimental effect on the movement and velocity of the swimmers and can offer one swimmer an unfair advantage over another.

Heretofore, attempts have been made to dampen the wave action caused by turbulence in a body of water by breaking up the waves through a screen or other perforate float. For example, in the Kiefer Pat. No. 3,304,-560, granted Feb. 21, 1967, there is disclosed a racing lane float for marking racing lanes in an enclosed body of water, such as a swimming pool. The float includes a perforate surface resembling a cage, so that as a wave strikes the float, the wave passes through the perforate openings on the surface and breaks up into fragmentary waves. One problem with the Kiefer racing lane float is that the perforate surface merely breaks up a wave passing therethrough instead of dampening, or absorbing the shock impulse of the wave.

It is an object of the present invention to provide a device which is capable of reducing turbulence within a closed body of water, such as a swimming pool.

Another object of the present invention is to provide a turbulent dispelling racing lane float for swimming pools.

Another object of the present invention is to provide a winch for tightening the cable of a racing lane float system.

Another object of the present invention is to provide a racing lane float system comprising a string of turbulent-reducing devices.

A racing lane float according to the present invention comprises a body having a plurality of radially disposed ribs supported by a substantially cylindrical housing. A plurality of rings are mounted to the ribs in spaced relation, the area of the space between adjacent rings being smaller than the area of the rings. The radially disposed ribs provide a solid wall. A buoyant means is provided within the tubular housing and a cable is passed through each float so as to provide a string of floats. The floats are mounted to the cable so that the float can rotate about the axis of the cable.

According to one feature of the present invention, a winch is provided to be connected to a rigid wall, such as a wall of a swimming pool. The winch includes a draw screw and a screw engagement means. One of the elements is connected to the body of the winch, and the other is connected to the side of the pool so that upon rotation of the body of the winch, the draw screw rotates relative to the screw engagement means so as to provide an axial pull on the cable.

The above and other features of this invention will be more fully understood from the following detailed description, and the accompanying drawings, in which:

FIGS. 7A through 7G are end view elevations in cutaway cross-section of a racing lane float in accordance with the present invention illustrating the manner in which the float dampens a turbulent wave.

Figure 1:
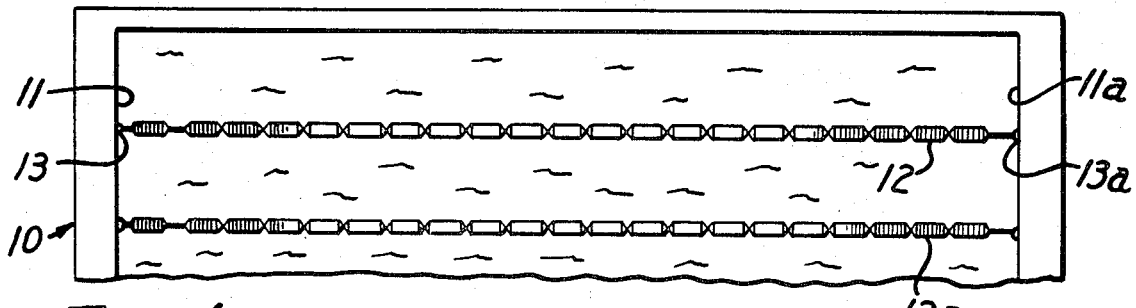
FIG. 1 is a planar elevation view of a portion of a swimming pool having a plurality of lanes marked by means of a plurality of floats in accordance with the presently preferred embodiment of the present invention.

Referring to the drawings, and particularly to FIG. 1, there is illustrated a swimming pool 10 having side walls 11, 11a between strings 12, 12a of racing lane floats are attached. Each string of floats is attached between walls 11 and 11a by means of suitable fasteners 13 and 13a, respectively.

Figure 2:
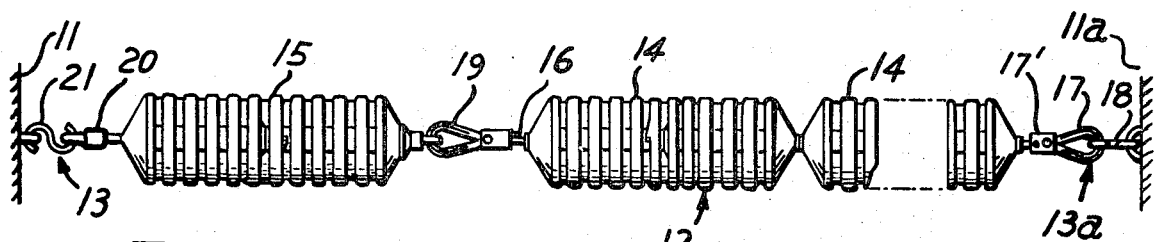
FIG. 2 is a side view elevation of a portion of a string of racing lane floats in accordance with the present invention.

In FIG. 2 the details of a string 12 are illustrated. Each string 12 includes a plurality of turbulent reducing float devices 14 and a winch 15. Cable 16 extends through each float device 14 in such a manner that the float devices are in end-to-end abutment. Fastener 13a comprises S-hook 18 fastened to wall 11a and eye-hook 17 connected to S-hook 18. Eye-hook 17 may be formed by folding over the end of cable 16 and fastening the cable to itself with a suitable clamp 17', suitable eye-hook 17 and S-hook 18. The opposite end of cable 16 is connected by means of eye-hook 19 (which may be formed in the same manner as eye-hook 17) to one end of winch 15. The opposite end of winch 15 is connected by eye-hook 20 and S-hook 21 to wall 11 of the swimming pool.

Figure 3:
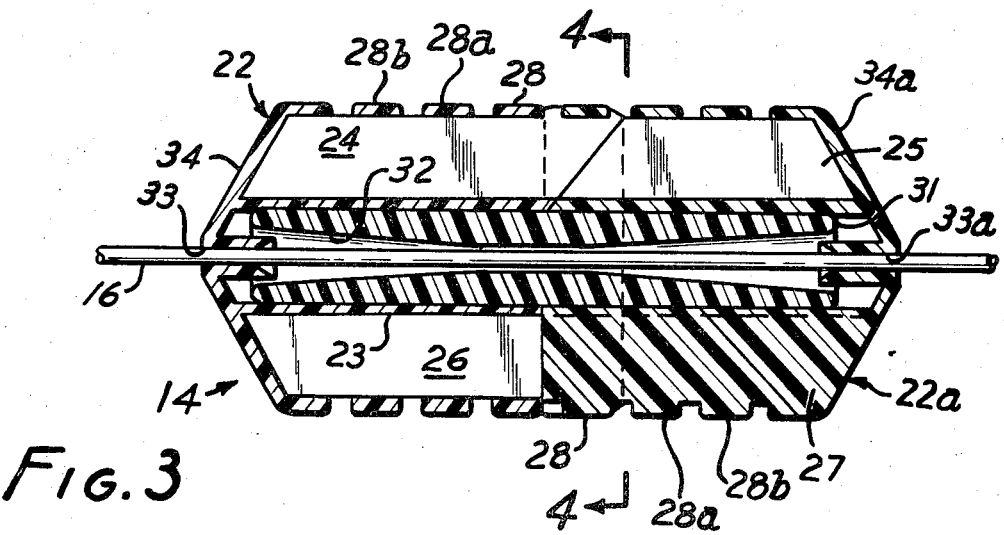
FIG. 3 is a side view elevation in cutaway cross-section of a racing lane float in accordance with the present invention for use in the string illustrated in FIGS. 1 and 2, FIG. 3 being taken at line 3—3 in FIG. 4.
Figure 4:
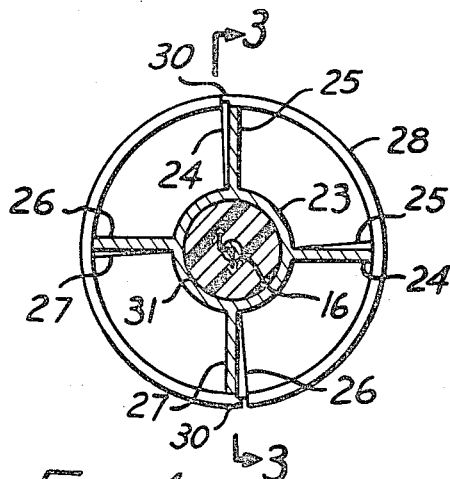
FIG. 4 is an end view elevation in cutaway cross-section of racing lane float taken at line 4—4 in FIG. 3.
Figure 5:
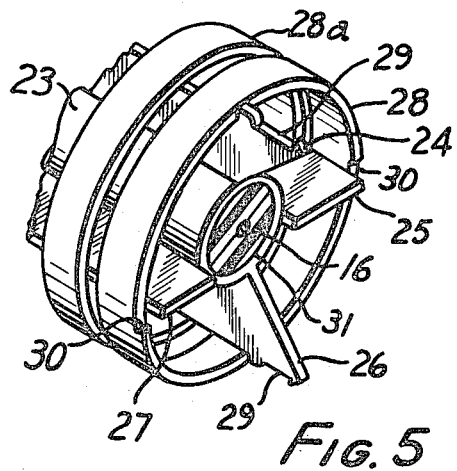
FIG. 5 is a fragmentary perspective view of a portion of the racing lane float shown in FIGS. 3 and 4.

The details of each turbulent-reducing float device 14 are illustrated in greater detail in FIGS. 3–5. Referring to FIGS. 3–5 there is illustrated a float device comprising a pair of substantially identical housings 22, 22a which are fastened together in end-to-end relationship. Each housing 22, 22a includes a substantially cylindrical housing 23 and a plurality of radially disposed substantially imperforate arms or ribs 24, 25, 26 and 27 extending from housing 23. A plurality of ring members 28, 28a, etc. are mounted to the outer portion of the radially disposed arms. As shown particularly in FIG. 5, arms 24 and 26 includes a projected portion extending beyond end ring 28, which projected portion has a notch 29 formed in the outer portion thereof. As will be more fully understood hereinafter, when housing 22 is assembled to a similar housing 22a, arms 24 and 26 extend into the region beneath the end ring 28 of the other housing so that notches 29 of arms 24 and 26 engage the under portion of ring 28. Detent 30 is formed in the end of ring 28 so that when the housings are assembled, each arm 24 and 26 is sandwiched between a respective arm 25 or 27 and detent 30, thereby providing relative rotation of the assembled housings.

Buoyant means 31 is disposed within the cavity formed by cylindrical portions 23 of housings 22, 22a. Buoyant means 31, which may, for example be constructed of a closed-cell styrene foam, has passage 32 disposed therethrough. Openings 33, 33a are disposed through end walls 34, 34a of each housing 22, 22a so that cable 16 may be passed through the openings 33, 33a and passage 32 of buoyant means 31. The closed-cell styrene construction of buoyant means 31 assures proper buoyancy to float 14 so that the float 14 will be only partially submerged in the water. As will be more fully understood hereinafter, it is preferred that the water line of the float device be approximately coplanar with the axis of the float device.

Alternatively to a tubular buoyant insert, the cavity formed by housing 22, 22a may be filled with a malleable foam so as to provide buoyancy to the device. As another alternative to a buoyancy means, the cavity formed by tubular portions 23 may be sealed closed by suitable seal means (not shown) so that the air enclosed within the cavity will provide a buoyant effect. It is preferred, however, that a foam styrene insert or other buoyant insert be placed within the cavity formed by the tubular portions 23 as shown in the drawings.

The device illustrated in FIGS. 3–5 are assembled by passing cable 16 through an opening 33 of a housing 22 and thereafter through passage 32 of buoyant insert 31. The insert 31 is then assembled into the tubular portion of housing 22, and the cable is then passed through opening 33a of the other housing 22a. Housing 22a is then assembled to buoyant insert 31 and thereafter to housing 22. Arms 24 and 26 of the respective housings are snapped under the ring members 28 of the opposite housing so that the recesses 29 of the respective arms engage a respective ring member 28. The housings are then relatively rotated to the position illustrated in FIG. 4 so that detents 30 on each housing hold the arms 24 and 26 of the other housing in position.

The resulting device thereby appears as an elongated tubular racing lane float having ring members spaced apart and supported by solid radially-disposed arms or ribs. Buoyancy is provided by the buoyant device 31 within the cavity formed by tubular portions 23.

It is preferred that the spacing between adjacent ring members 28 be such that the ratio of the area of the openings to the area of the entire surface be less than about 1 to 4. In tests conducted on one embodiment of the racing lane float in accordance with the present invention, the spacing between adjacent ring members was 0.23 inch and the width of each ring member was 0.67 inch. In this device, the openings represented approximately 25.5% of the entire cylindrical surface area of the racing lane float. This arrangement provided adequate dampening of wave turbulence of an enclosed swimming pool. In tests conducted on another racing lane float constructed in accordance with the present invention wherein the spacing between adjacent ring members was 0.18 inch and the width of each ring member was approximately 0.75 inch, the openings between ring members represented approximately 19.4% of the entire cylindrical surface area of the racing lane float, and the turbulent-reducing effect produced by the racing lane floats were found to be better than that provided by the racing lane floats of the first example. Specifically, turbulent waves had lower wave crests and dispelled more quickly with a string of racing lane floats in the second example than with a string of racing lane floats in the first example. Accordingly, the ratio of the area of the openings to the surface area of the cylindrical portion of the racing lane float should be less than about 1 to 4.

Preferably, insert 31 is loosely journaled to the inside of tubular portion 23 and/or cable 16 is loosely journaled to openings 33, 33a and passage 32. By loosely journaling the cable and/or insert to housings 22, the housings are free to rotate about the axis of the cable for purposes to be more fully explained hereinafter.

Figure 6:
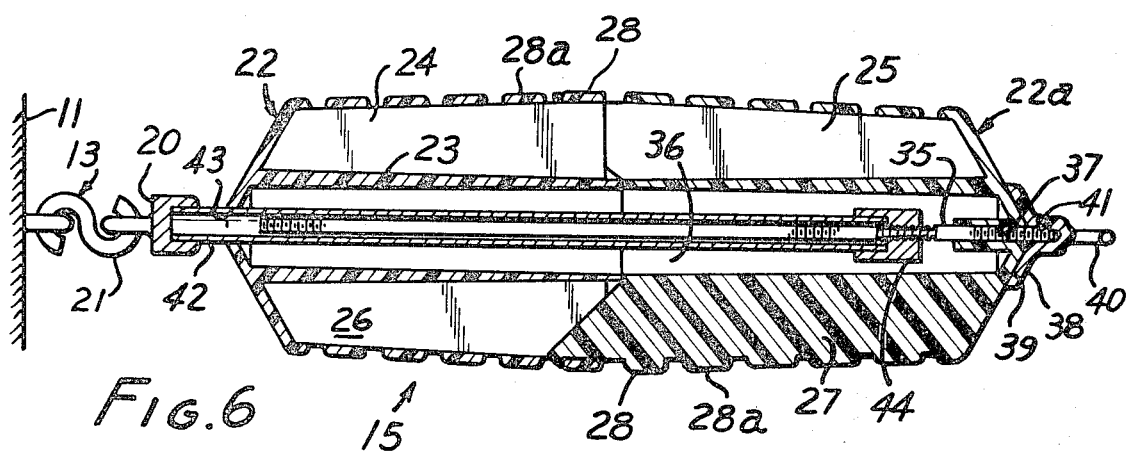
FIG. 6 is a side view elevation in cutaway cross-section of a winch for use in a string of racing floats in accordance with the present invention.

FIG. 6 illustrates the details of winch 15. Each string of racing lane floats includes a single winch device for tightening the cable between the opposite sides of the swimming pool. The body of winch 15 may be constructed of a pair of housings 22, 22a which are identical to the housings of the racing lane floats described in connection with FIGS. 3–5. Particularly, each housing 22 includes a cylindrical portion 23 and a plurality of radially extending arms 24, 25, 26 and 27 which support rings 28, 28a, etc. Like the racing lane floats, housing 22, 22a of the winch may be constructed of suitable hard plastic. Draw screw 35 is mounted within cavity 36 and extends into openings 37 of housing 22a. Cap device 38 is bonded by means of adhesive 39 to the end of housing 22a so as to extend over draw screw 35. Preferably, a hook device 40 is mounted to cap 38 so as to engage eye-hook 29 at the end of cable 16 (see FIG. 2). Also, lock screw 41 may be provided to prevent relative rotation of draw screw 35 with respect to housing 22 and cap 38. Tubular shaft 42 is mounted to eye-hook 20 and is journaled to opening 43 of housing 22 to extend into cavity 36. Threaded fastener 34 is fixedly mounted to the free end of shaft 42. Fastener 44 is threadably engaged to draw screw 35.

In the operation of winch 15, a cable attached to hook 40 may be tightened by rotating the body of winch 15 about its axis. By rotating the body of winch 15, housings 22 and 22a rotate, thereby rotating draw screw 35. Since draw screw 35 is threadably engaged to fastener 44 which in turn is fixedly mounted to shaft 42, draw screw 35 rotates relative to fastener 44 thereby causing an axial pull on the cable attached to hook 40. Hence, the cable can be tightened or loosened, as desired.

FIGS. 7A–7G show, in sequence, the effect of turbulence on a float device according to the present invention. In each FIGS. 7A–7G, there is illustrated a float device 14 having a plurality of rings 28 supported on radially extending arms 24, 25, 26 and 27. Float 14 is shown disposed in the body of water 51 so that the float is approximately one-half submerged, the other half being exposed above the surface 50 of the water. In calm water, the float device will ordinarily assume the position illustrated in FIG. 7A with two ribs approximately horizontal and two ribs approximately vertical. However, in FIGS. 7A–7G the water is shown turbulent and waves 52 are moving in the direction of arrows 53. With reference to FIGS. 7B–7D, wave crest 52 is shown moving into the cavity 54 between ribs 24 and 27 so that, as illustrated in FIG. 7C, the wave strikes the imperforate wall of rib 24. It can be shown that water within a wave front moving in the direction of arrow 53 will move in a generally circular motion in the direction of arrow 60. As the wave strikes the rib, the float device rotates counter-clockwise, in the direction of arrow 55. When the float device is in the position shown in FIG. 7B, the cavity 56 between ribs 26 and 27 is filled with water while cavity 57 between ribs 24 and 25 is empty. However, as the float device 14 rotates about its axis, as illustrated in FIGS. 7C and 7D, cavity 56 is moved to a position above the mean surface of the water while cavity 57 is moved to a position below the mean surface of the water. Water enters cavity 57 from the region forwardly of the wave (to the left of the float device as shown in the drawings) so that the water level lowers. As the float device rotates, the water in cavity 54, which represents a substantial portion of the wave, moves into the region of lowered water level so that the water within cavity 54 is dispelled into the air pocket formed by cavity 57 thereby dispelling or dampening wave crest 52.

The water within cavity 56 is dispelled toward the rear of the wave and into the wave root which is ordinarily below the mean level 50 of the water. Between each crest 52 is a root 58 which has a water level below the mean surface of the water. When root 58 reaches antiturbulent float 14, the root cavity draws water out of cavity 59 disposed between ribs 25 and 26 of float device 14, thereby unbalancing the weight within the float device to rotating the float device clockwise in the direction of arrow 61 (FIG. 7F). The water in cavity 59 moves into the air pocket formed by root 58 thereby dispelling or dampening the root, and the air in cavity 56 takes up water from the next crest 52 of the turbulent waves.

The ribs of the float device are shown in the drawing as completely impervious to water. It will be understood, of course, that in case the ribs should contain perforations which are so minor in area that the rib is substantially imperforate, this will be in conformity with the present invention. The rib will be substantially imperforate within the scope of the present invention if any perforations which may exist are so insignificant in area that the float device will rotate about its axis when struck by a wave movement so as to substantially dampen the wave, as distinguished from allowing the wave to substantially pass through any such perforations.

The present invention thus provides a turbulent-reducing racing lane float which is capable of dampening turbulent waves in a body of water. The device is effective in operation, easily fabricated, and easily installed without special equipment.

This invention is not to be limited by the embodiments shown in the drawings or described in the description, which are given by way of example and not of limitation, but only in accordance with the scope of the appended claims.

What is claimed is:

1. A turbulence-reducing device for reducing wave turbulence in a body of water, said device comprising: a housing defining a cavity and having an axis; buoyant means in said cavity; a plurality of substantially imperforate radially-disposed ribs supported by said housing; and a perforate body supported by said ribs in spaced relation to said housing, said body having a plurality of openings, said openings and said body together defining a surface area of said device, the area defined by said body predominating.

2. Apparatus according to claim 1 wherein the surface area of said device defined by said openings is not greater than about one-fourth of the entire surface area of said device.

3. Apparatus according to claim 1 wherein said perforate body comprises a plurality of spaced rings supported by said ribs.

4. Apparatus according to claim 1 further including means for axially supporting said device on a cable for relative rotation about said axis.

5. Apparatus according to claim 4 wherein said bouyant means comprises a closed-cell foam plastic insert in said cavity, an axial passage through said insert, and axially-disposed opening means at each end of said housing, said cable being passed through said opening means and said passage.

6. A winch for use in a string of racing lane floats, said winch comprising: a housing defining a cavity and having an axis; first attachment means supported by said housing at one end thereof for attaching said housing to a cable supporting racing lane floats; a first threaded fastener in said cavity attached to said housing; a second threaded fastener in said cavity and threadably engaged to said first threaded fastener; and second attachment means supported by said second threaded fastener for attaching said second threaded fastener to a rigid wall, whereby upon relative rotation of said housing to said second attachment means, said threaded fasteners rotate relative to each other thereby causing an axial pull on said cable.

7. A winch according to claim 6 further including a plurality of imperforate radially-disposed ribs supported by said housing; a perforate body supported by said ribs in spaced relation to said housing; said body having a plurality of openings, said openings and said body together defining a surface area of said winch, the area defined by said body predominating.

8. A winch according to claim 6 wherein said second threaded fastener is journaled to said housing.

9. A string of racing lane floats defining a racing lane in a body of water comprising, in combination: a cable; a plurality of turbulence-reducing devices mounted to said cable for reducing wave turbulence in said body of water, each of said devices comprising a first housing defining a first cavity and having an axis, buoyant means in said first cavity, a plurality of substantially imperforate radially-disposed ribs supported by said first housing, and a perforate body supported by said ribs in spaced relation to said first housing, said body having a plurality of openings, said openings and said body together defining a surface area of said device, the area defined by said body predominating; and a winch comprising a second housing defining a second cavity and having an axis; first attachment means supported by said second housing at one end thereof and attached to said cable; a first threaded fastener in said second cavity attached to said housing; a second threaded fastener in said second cavity and threadably engaged to said first threaded fastener; and second attachment means supported by said second threaded fastener attached to a rigid wall, whereby upon relative rotation of said housing to said second attachment means, said threaded fasteners rotate relative to each other thereby causing an axial pull on said cable.

10. Apparatus according to claim 9 wherein the surface area of said device defined by said openings is not greater than about one-fourth of the entire surface area of said device.

11. Apparatus according to claim 9 wherein said perforate body comprises a plurality of spaced rings supported by said ribs.

12. Apparatus according to claim 9 further including means for axially supporting said devices on said cable for relative rotation about said axis.

13. Apparatus according to claim 9 further including a plurality of imperforate radially-disposed second ribs supported by said second housing; a second perforate body supported by said second ribs in spaced relation to said second housing said second body having a plurality of second openings, said second openings and said second body together defining a surface area of said winch, the area defined by said second body predominating.

References Cited

UNITED STATES PATENTS

| | | | |
|---|---|---|---|
| 3,011,178 | 12/1961 | Stone | 4—172 |
| 3,050,750 | 8/1962 | Harrison | 9—8 |
| 3,074,083 | 1/1963 | Schirmer | 9—8 |
| 3,116,925 | 1/1964 | Welch | 9—8 |
| 3,304,560 | 2/1967 | Kiefer | 4—172.15 |

LAVERNE D. GEIGER, Primary Examiner

H. K. ARTIS, Assistant Examiner

U.S. Cl. X.R.

9—8